W. B. WESCOTT.
CINEMATOGRAPHY.
APPLICATION FILED NOV. 10, 1914.

1,245,844.

Patented Nov. 6, 1917.
5 SHEETS—SHEET 1.

Inventor: William B. Wescott,
by Roberts Roberts & Cushman
Attorneys.

UNITED STATES PATENT OFFICE.

WILLIAM BURTON WESCOTT, OF BOSTON, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

CINEMATOGRAPHY.

1,245,844.      Specification of Letters Patent.      Patented Nov. 6, 1917.

Application filed November 10, 1914. Serial No. 871,398.

*To all whom it may concern:*

Be it known that I, WILLIAM BURTON WESCOTT, a citizen of the United States, and resident of Boston, in the county of Suffolk and State of Massachusetts, have invented new and useful Improvements in Cinematography, of which the following is a specification.

This invention relates to cinematographs employing continuously moving films, and consists in certain modifications of the cinematograph shown in an application for Letters Patent of the United States filed by William Burton Wescott on October 9, 1914, Serial No. 865,962.

There are many reasons why a motion picture projector using a continuously moving film would be greatly superior to the present type of intermittent motion film. Besides increasing the life of the film with ordinary usage, machines of this type lend themselves readily to the production of pictures which pass more or less continuously into each other on a screen, thus eliminating the disagreeable luminosity flicker commonly present in motion pictures. Moreover, owing to the absence of the destructive intermittent motion the film can be run at speeds much higher than is practicable with machines in which this motion is present, thus making possible simple three-color projection hitherto unattainable. The absence of the dark interval between pictures on the other hand, permits a low picture frequency, which is desirable not only in the slowing down of motions photographed at a higher frequency but also in certain cases for the reduction of the so-called "motion flicker" as distinguished from luminosity flicker. Such machines should be capable of being run at any speed from zero up to, say, 40 or 50 pictures a second.

The best present motion picture practice involves the use of a shutter so shaped or used that the dark intervals are equal to or a large fraction of the light intervals, hence, above the fusion threshold, that is, above the lower limit of apparently continuous vision, the intensity of the projection beam must be, for a given screen area and illumination, substantially greater and often twice that required where there is no dark interval.

Therefore the theoretical minimum projection-beam intensity is that which gives the desired screen illumination when uninterruptedly reaching the screen, and the theoretical minimum of light is reached when the desired screen illumination is attained with a beam of minimum intensity which just covers the picture projected.

In order to eliminate the dark interval, one picture must be replaced by the next by first a progressive substitution, either of one picture as a whole by the next by the increase and corresponding decrease of intensity of the beams projecting two pictures in register on the screen, or second by a lateral or vertical progressive substitution of corresponding sections of succeeding pictures.

The first involves the coincident complete illumination of both pictures, hence, either two beams from two sources (impossible to maintain of equal intensity) or parts of the same beam covering both pictures may be used. In either case the difficulty of maintaining an equal illumination of the picture is great and but half the light passing through the two pictures reaches the screen. The above dissolving substitution will not be further considered because the irreducible minimum loss of light is at least 50% greater than is attainable by progressive substitution.

The second may be either a rapid or a slow progressive substitution; that is, the time of substitution may occupy but a small fraction of the time allotted to each picture or it may occupy the whole of such time. In the latter case, the picture projected is made up of a slowly decreasing part of one picture and a correspondingly increasing part of the next, except at the instant when the second has been completely substituted for the first. In general, a slow substitution will produce a distortion wave which, except at very high speeds, will readily be detected and hence mar the screen picture.

Among the many published designs for continuous film motion cinematographs, there is not one of even indifferent commercial success, and the cause of the failures lies largely in the unique accuracy needed in the essential optical and mechanical parts. To be practically successful the machine must not only be accurate when it is first made, but it must not lose this accuracy in use.

The general problem which faces the designer of a continuous film motion cinematograph is that of obtaining an undistorted stationary image of a moving object. It can readily be seen that this end cannot be attained without the introduction of some other motion into the optical system. In the special instance here considered the object is the moving film and the final image is the picture on the screen. Between the two is a series of optical elements, and it follows that in order to make the screen picture stationary there must be motion somewhere in this series. In general, the motion will be of one element in a series only. In this case the stationary optical system between this element and the film serves to form a moving image of the film, which image becomes the object for the movable optical element in question. The special problem is so to move this element that the image produced by it in turn will be stationary at the screen, or act as a stationary virtual object which may be framed and projected on a distant screen or otherwise treated by subsequent optical devices.

The fundamental requirements made of such machines are that the individual pictures be brought to rest optically; that successive pictures be accurately superimposed and that the illumination of successive pictures be constant and uniform.

To produce a rapid progressive substitution of succeeding pictures there is required a plurality of compensating reflectors, two of which must receive light, at the time of substitution, from all parts of corresponding pictures, hence there must be either; two projection beams or one beam must either shift from one reflector to the next or be traversed by the reflectors. But it has been pointed out that the motion of the compensating reflector must be of a very high order of precision, hence should be of the simplest nature possible; whereas the motion of any means to move the beam from one reflector to the next need not be so precise.

In general, therefore, it will be desirable to so move the projection beam before it reaches the film that progressive substitution is attained by projecting successive pictures along distinct paths to corresponding compensating reflectors.

In order to avoid discontinuity in projection either in the nature of a dark interval or a blur as one picture gives place to the next, there must be at least two moving compensating elements, since it is obvious that if such discontinuities are to be avoided, there must be instants when two film pictures are simultaneously in action. For satisfactory results, therefore, there should be at least two moving optical parts. From two the number may be increased indefinitely up to the limit of convenience.

It is obvious that in general the film gate opening must be at least two pictures long, in order that, at the time of substitution, both the picture being exposed and the next succeeding picture may be exposed to the projection beam, and further that the projection beam must either cover two pictures in the film gate opening or cover and follow one picture and swing back to the next succeeding picture to produce progressive substitution.

In addition to the many special difficulties which must be overcome in the production of a successful continuous film motion cinematograph, there is a general difficulty which appears in nearly every aspect of the problem. This is the difficulty imposed by the requirement of extreme optical and mechanical accuracy which has already been mentioned as one of the chief causes of the failure of extant designs. This requirement of accuracy makes itself felt in two general directions, first, with regard to the correctness of all optical surfaces which have to deal with moving images or objects, and second, with reference to the exactness of the motions themselves, and hence of the mechanical arrangements which cause these motions.

In a perfect machine the film and optical devices would be so moved that the displacement of the image space would be exactly equal and opposite to that of the image in that space, that is, the film motion and the compensation movement would be perfectly matched, but since it is necessary to connect these two motions in practice by more or less fallible mechanical systems only an approximation to the ideal can be attained. It is the closeness of this approximation in service which must determine the success or failure of a given machine.

In the ordinary stationary projection of a single lantern slide, a distortion of the whole picture, say a narrowing of two or three per cent. would not be noticeable to the eye. In the case of motion picture projection with a continuously moving film, however, this distortion would cause the image of a given point in the picture to move on the screen and a blur would result. Moreover, the pictures which follow each other in the series must be of the same light intensity, and must accurately coincide. This latter requirement exists also, of course, for the ordinary cinematograph, but additional difficulties in securing satisfactory registration enter in the case of the continuous film motion machine.

In the average case, if a stationary point in the picture on a screen varies in position during the time that one film picture is active by more than about an eighth of an inch, to an observer at a distance of fifteen or twenty feet, there will be a perceptible blurring of the screen picture. An eighth of an inch on the screen is about .001 or one tenth of one per cent. of the size of the whole screen picture, and since this picture is simply an enlarged reproduction of the film picture the same fractional accuracy holds for the latter. Hence it follows that if there is any persistent irregularity in the motion of the film with relation to the moving optical parts designed to compensate for the film motion as large as .001 the size of a film picture, blurring will result.

In the prior continuous motion apparatus above referred to there are physical difficulties such as motion compensation made optically imperfect by the fact that the compensation accurately relates only to one point or line of the picture, instead of to the whole area of the picture; or, when compensation has been successfully arranged for all points of the area, because this has been attained only in parallel rays from a point source, which in practice are unattainable; or because the image is distorted or the definition imperfect due to undesirable refractive effects in the optical parts or due to the necessary position of the image with respect to optical parts; or because of chromatic effects due to dispersion (especially harmful in the case of compensation by motion of a refractive element when correction becomes physically impossible); or because of the necessity of irregular motion of the optical element or of the film in the case of compensation by refractive elements; or because of the loss of light in the optical system (any excess of light being accompanied by an excess of heat which is damaging to the film); or because of a dark or blur interval between film pictures on the screen; or because of the presence of "ghosts" or double images when a back-silvered glass mirror is used with non-parallel rays incident other than perpendicular to the surface. There are mechanical difficulties because of the imprecision and impermanency with accuracy essentially characterizing the gears, chains, and certain forms of cams, especially when connecting the film and compensation motions, because of the vibration due to rapid irregular motions; because of the easy vitiation of metal surface mirrors; because of general mechanical intricacy; and because of the mechanical difficulty of superimposing pictures from two separate film-driving systems. There are economic difficulties, such as the loss of light, the cost of unusual lenses, prisms, mirrors or other optical parts, of constructing precision instruments in general, of a multiplicity of optical elements, of making complicated mechanisms in general and the inadvisability of requiring a non-standard film.

The object of the present invention is to produce a continuous film motion and a uniform and continuous illumination cinematograph which shall approximate optical and mechanical perfection as closely as possible, which shall make possible a motion of pure rotation in the compensating elements, which shall economize the use of light, which shall be simple and durable in construction and shall contain the fewest possible number of parts, especially between the film-driving and the compensating elements, thus reducing the chance of inaccuracy either in the original construction or as a result of wear, and in general to overcome the difficulties above set forth.

In general, the ends sought to be attained and the problems sought to be solved by the present machine are the same as more fully described in said application of William Burton Wescott, Serial No. 865,962, to which reference is hereby made, but the compensation method although involving certain principles common therewith is different. In the exemplification of the invention shown in said former Wescott application the compensating reflectors to which the beams moving with the film are successively projected, consist of two oscillating mirrors. As already explained, there must be at least two such moving optical parts to avoid discontinuous projection. From the two the number may be increased indefinitely up to the limit of convenience and in general the nature of the motion involved will be simpler dynamically and hence mechanically more practicable with a very much larger number of the units than two. With but two compensating elements the motion must be reciprocating, while with a sufficiently large number of compensating elements a rotary and hence uniform motion may be employed. In the types of machines in which the compensating optical element is given a reciprocating motion, cams or their equivalent must be used, and while it is possible to make cams of a high order of accuracy and to coördinate them so that variations due to wear shall appear only as a difference between the wear of two similar cams, nevertheless it is desirable to eliminate the use of cams and to substitute a pure rotary motion of the compensating elements for a reciprocating motion.

To this end, the present projection machine has been designed, wherein the mechanical compensating motion is a simple motion of pure rotation, the optical compensating elements being reflectors preferably in the form of ninety degree prisms, carried by a rotary drum. Furthermore, the film passes directly from the place where the light passes through it to the essential rotating element (the drum) and is driven directly by it without the intervention of gears or cams between the film and the compensating motion. Of course, the use of cams or gears in any other part of the machine where delicate accuracy is not required is quite permissible. Except for said rotating series of elements, all other optical parts between the film and the screen are stationary. The compensating elements as herein shown consist each of a totally reflecting ninety degree prism, or the equivalent combination of two plane right-angle mirrors, successive prisms of the drum of prisms compensating for the motion of successive film pictures. With such prisms or right-angle mirror pairs the image space will be displaced with twice the linear velocity of mirrors, and in the same direction, by a translation of the latter perpendicular to their line of intersection, i. e. their vertex, and will not be affected at all by a rotation about this line as an axis. Thus by moving the compensating elements at half the linear velocity of the film (leaving out of account a variation hereafter explained) the image will remain stationary.

The beam of light projected through the film is moved with the film whereby the major or effective portion of the light beam is projected during a desired period of time through one picture of a constantly moving series substantially without loss of light, and with the further advantage that light of relatively low intensity, and consequently generating less heat, may be used, thereby reducing the danger of burning the film. The beam following the successive film pictures is so manipulated before the film as to shift the beam, passing through successive film pictures to successive compensating reflectors. This motion is in that part of the system where less accuracy is required.

The means for moving the beam with the film, as herein shown, consists of two revolving helical mirrors, in each of which the angle made by an extension of a radial element of the reflecting surface with the axis of rotation varies progressively along the length of the mirror. The two helical mirrors are identical. The beam from each helical mirror, while moving with the film, is thus also swung about a fixed point, or kept in line with a fixed point, or near enough such point so that the movement of the beam where it meets the compensating element is substantially less than at the film. The beam is thus caused to follow not only the film picture but the corresponding slower moving compensating element. A beam covering two pictures might be used, and the film and compensating elements be passed therethrough, but such beam would at all times have to be shuttered for the area of one picture, and at least half the light would be wasted.

While it is believed that the helical mirror affords the best means for causing the light beam to follow successive film pictures and successive compensators, it is to be understood that the invention is not limited to such specific means, but contemplates the use of any means for obtaining the same result.

In the accompanying drawings which illustrate one embodiment of the invention,—

Figure 1:
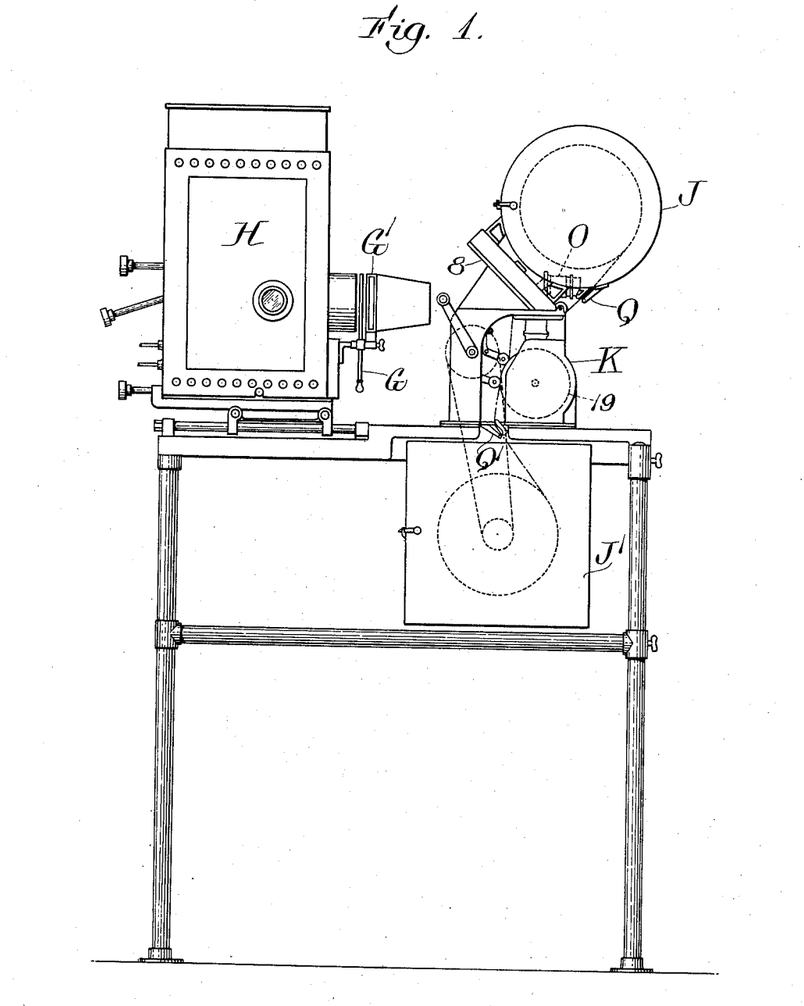
Figure 1 is a side view of an optical lantern as a whole containing the invention.

The optical lantern comprises the lamp house H of the ordinary fire underwriters' type, G being a swinging shutter suitable for use with the slide frame G' for ordinary projection. The feed reel magazine is shown at J and the take-up reel magazine at J'. Fire traps of any approved type may be used at Q and Q' where the film enters and leaves the motion head K. The film passes through the motion head K on its way from the feed reel magazine to the take-up reel magazine and it is in the motion head that the present invention is contained.

Figure 2:
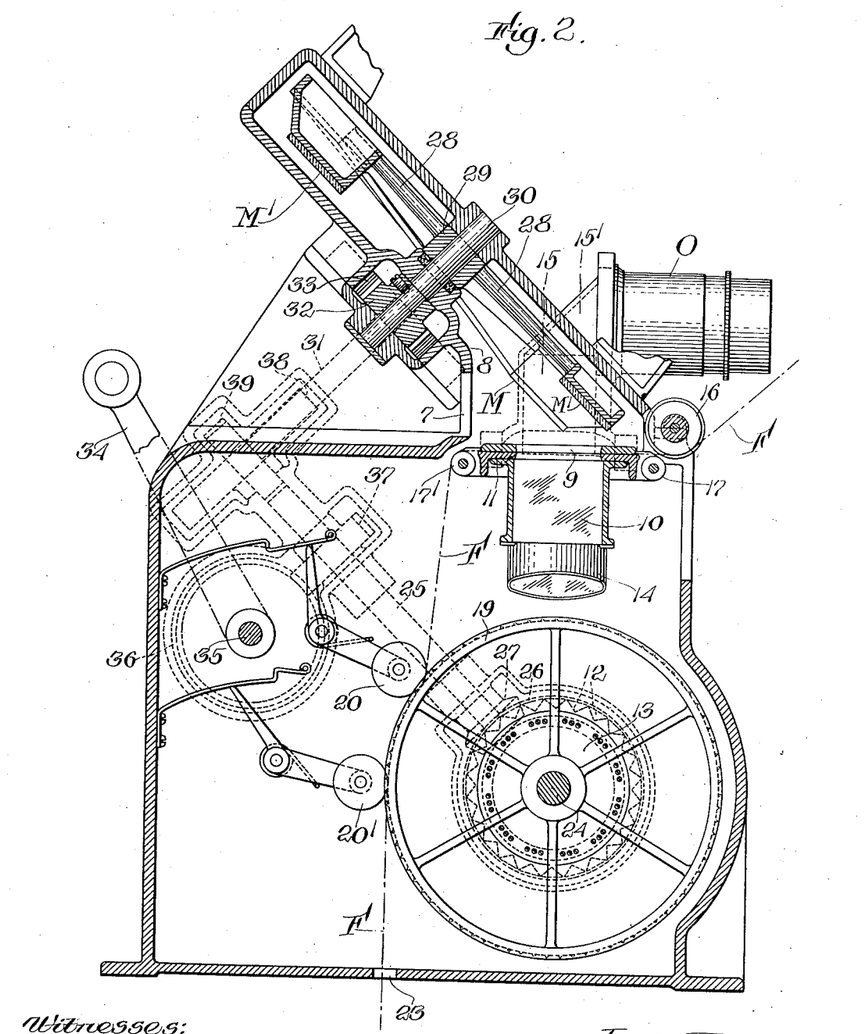
Fig. 2 is a sectional view upon an enlarged scale on line 2—2 of Fig. 3, partly in side elevation, of the motion head containing the invention.
Figure 3:
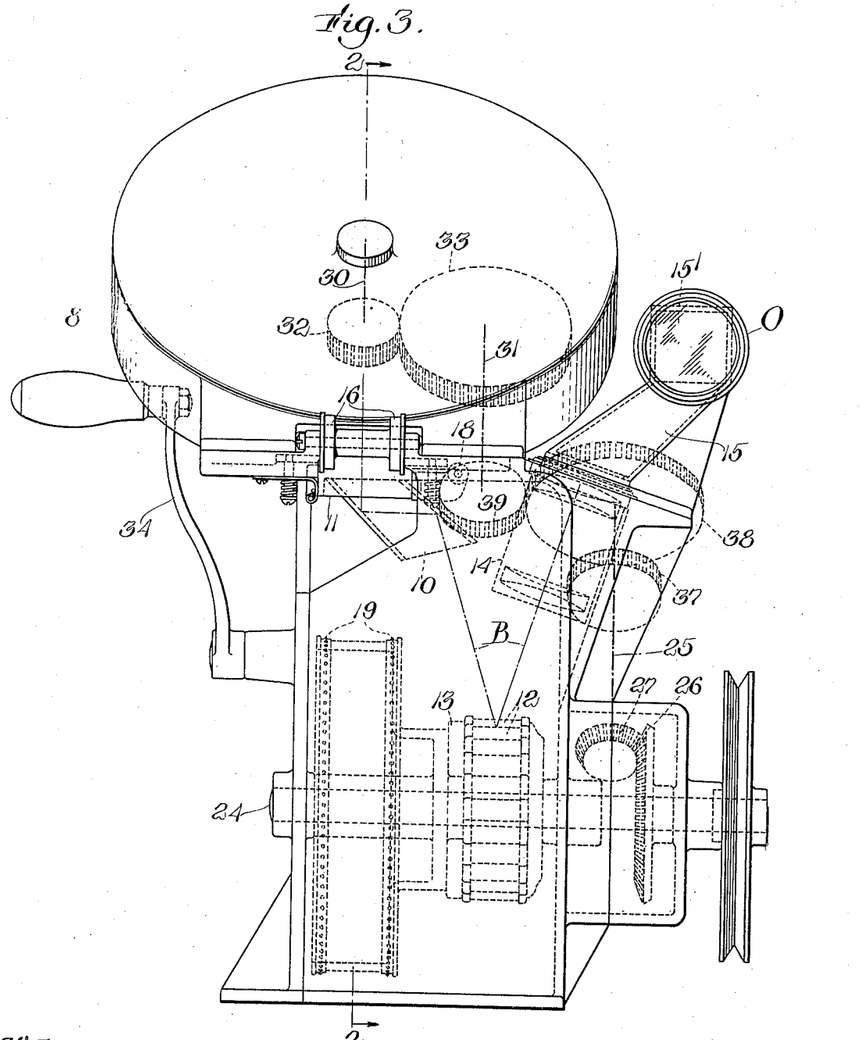
Fig. 3 is a front view of said motion head, the gearing in both Figs. 2 and 3 being shown diagrammatically.

The light from the lamp house H enters the motion head through a port 7 in the housing wall 8 and is reflected first from the helical mirror surface M and then from M' through the film F in the film gate 9 and thence through the reflecting prism 10, which is attached to the lower film gate member 11, to the compensating elements 12 mounted on drum 13 keyed to shaft 24, and thence through lens 14, and reflecting prisms 15 and 15' to the objective lens O. The reflecting surfaces of prism 10 are arranged at such angles that the beam B passes obliquely to the compensating prisms 12, whereby the outgoing beam to lens 14 and objective O will follow a distinct path from the incoming beam to prisms 12 (Fig. 3).

The film F in its course through the motion head passes under roller 16, over the film gate roller 17, between the fixed film gate member 9 and the lower film gate member 11, which is adapted to swing together with prism 10 about hinge 18, and thence over the film gate roll 17′ to the sprocket rim 19 on the shaft 24, and under pressure rollers 20 and 20′, and thence downward through an aperture 23 in the bottom of the motion head housing to the take-up reel.

The rim 19 made with sprocket teeth constitutes the rotary film-driving element, and is mounted on the same shaft 24, which carries the rotary carrier 13, thus the film-driving element and rotary carrier are rigidly connected and turn as one part. Shaft 24 is geared to the transmission shaft 25, through beveled gears 26 and 27. The ratio between the radius of the path of the virtual vertices of the compensating prisms 12 and the radius of the film-driving element, is such that said vertices move at a constant fraction, which is approximately one half, of the linear velocity of the film; for reasons hereinafter explained such fraction will be slightly in excess of half.

Two identical helical mirrors M and M′ are mounted, by means of spokes 28 and hub 29, on shaft 30 geared to the transmission shaft 31 through the gears 32 and 33. The angle made by an extension of a radial element of the reflecting surface of each helical mirror with its axis of rotation varies progressively along the length of the mirror, whereby the beam is caused not only to follow successive film pictures but to swing in such manner that it also follows the corresponding slower moving compensating prisms.

The motion of crank 34 on crank shaft 35 is communicated to the transmission shaft 25 through the helical gears 36 and 37, and the driving connection between shaft 25 and shaft 31 is effected by means of helical gears 38 and 39.

Figures 4, 5:
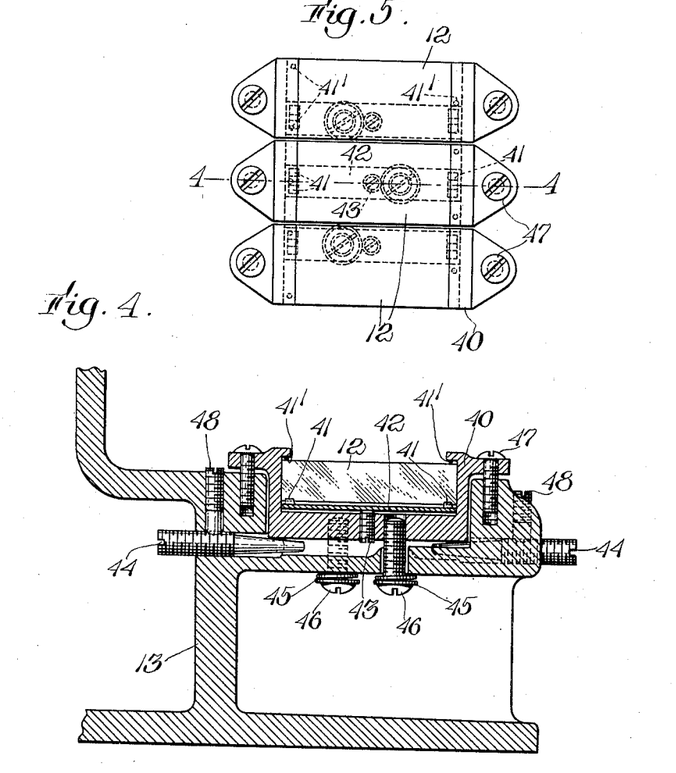
Fig. 4 is a side elevation partly in section on line 4—4 of Figs. 5 and 6, illustrating the mounting of one of the compensating elements.
Fig. 5 is a plan view of three of said compensating elements.
Figure 6:
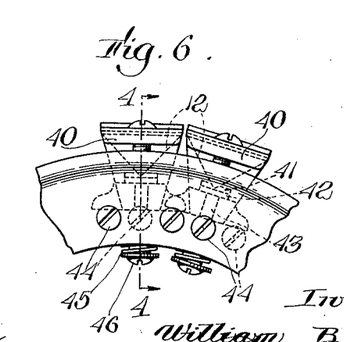
Fig. 6 is an end view of a fragment of the drum or rotary carrier on which said compensating elements are mounted.

The mounting of the compensating elements will be best understood by reference to Figs. 4, 5 and 6. Each compensating prism 12 is supported in a holder 40, in the bottom of which is a plate 42 provided with saddles 41 to receive the vertex of the prism. A set screw 43 extending through the bottom of holder 40 into engagement with the bottom of plate 42, holds the prism against the three pins 41′. The prism is thus clamped rigidly in the holder 40, but without strain on the glass. Adjustment of the prism mount or holder 40 on drum 13, is obtained by means of taper screws 44 of which there are two at one end and one at the other end of each prism holder. The prism holder may be bodily raised at either or both ends against the spring washer 45 on screw 46, which is set into the bottom of the holder and extends through a hole in the carrier drum 13, by means of the taper screws 44; and slight angular adjustments may also be made by said taper screws, to shift the vertex of the prism in relation to its distance from its neighboring prisms. Thus the prisms may be adjusted individually in respect to the relation of their virtual vertices to the direction of the axis of rotation of the carrier, the distance from said axis of rotation and the distance of said vertices one from another. When satisfactorily positioned with the vertices parallel to the axis of rotation, and the same distance from the axis and from each other, the holders 40 may be firmly secured to the carrier 13 by setting up the screws 46 and 47. The taper screws 44 are locked by set screws 48.

Figures 7, 8:
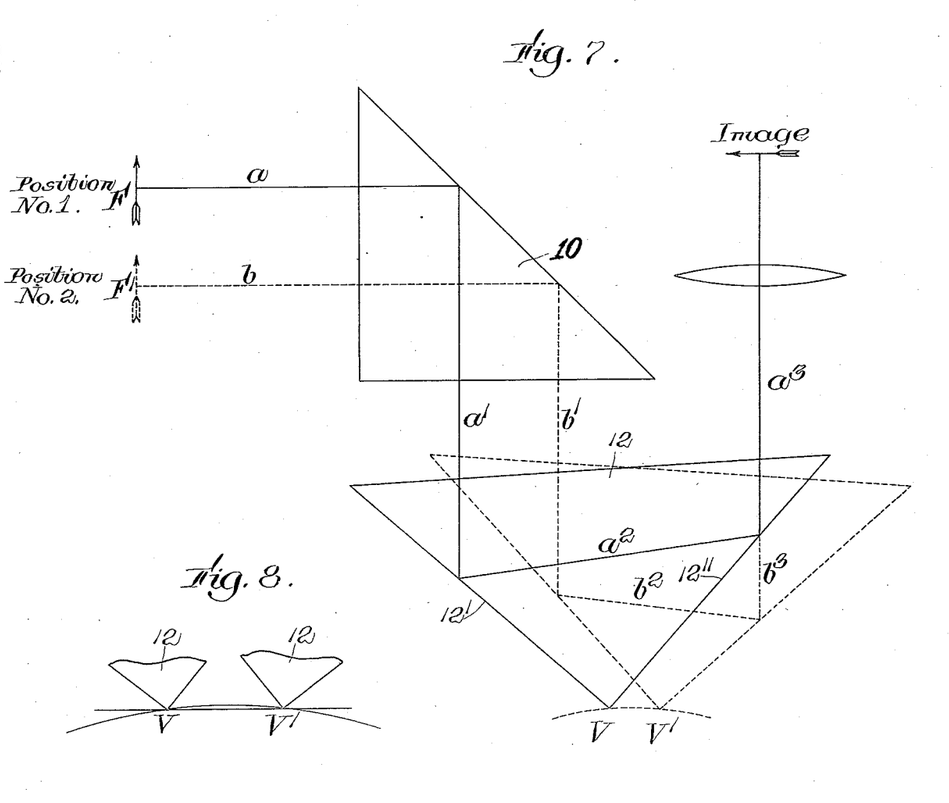
Fig. 7 is a diagram illustrating the action upon a light beam of one of said ninety degree prisms moving in an arcuate path.
Fig. 8 is a diagram illustrating the nature and extent of the error, which is negligible, resulting from the motion of the prism in the arc of a circle.

Referring now to the diagrams in Figs. 7 and 8; the arrows F, F′, represent two positions of a film picture on the moving film and 12 represents one of the totally reflecting right angle compensating prisms. A beam of light from film picture F in position No. 1 passes along the path $a$ and is brought by any suitable method, as by totally reflecting prism 10, along $a'$ and into the compensating prism 12. Thence, the path of the beam is from reflecting surface 12′ along $a^2$, and thence from reflecting surface 12″ along path $a^3$ to the image on the screen.

When the film picture F moves from position No. 1 to position No. 2, at F′, in order to secure complete and mathematically correct compensation, the prism vertex V should move in a straight line to position V′ at one half the linear velocity of the film. It is immaterial whether the prism swings or tilts on its vertex since the image remains unaffected by a motion of the prism about its vertex as an axis. But the motion of the prism vertex along a straight line involves either a sliding reciprocating motion, or, if continuous motion is used, a chain carrier, the objections to both of which have already been dwelt upon. To obtain a motion of pure rotation, the vertex of the compensating prism must move in a circular path and the virtual image of the film picture will therefore not remain strictly stationary but will undergo a slight lateral shift and also a slight shift toward and from the film. If, however, the circle in which the prism vertex moves has a radius equal to three times the width of a film picture or more, it is found that both of these shifts will produce negligible results at the screen. While the film picture is moving from position No. 1 at F to position No. 2 at F′, the vertex of the corresponding compensating prism moves in an arcuate path from V to V′, such distance in a straight line being one-half the distance of the travel of the film picture. The path of the light beam from the film picture at F′ will be along $b$, $b'$, $b^2$ and $b^3$, the latter coinciding with $a^3$, so that the image is stationary notwithstanding the motion of the film. The same will hold true at all intermediate points between positions No. 1 and No. 2 save for the negligible shiftings of the image above referred to, due to the curved path of the prism vertex. Now, since the distance traveled by the prism vertex V to V' in a straight line must be half the distance traveled in the same time by the film picture, it follows that as the prism vertex is moving in an arcuate path its linear velocity will not be exactly half that of the film, though it is approximately so, but the prism vertex will move at a constant fraction very slightly in excess of half of the linear velocity of the film. Fig. 8 represents two positions V and V' of the prism vertex connected by straight and arcuate paths. The motion of the virtual vertex, which is of use in compensation, is that component of its motion which is parallel to that of the film. This may be termed the lateral motion. It will be evident that the lateral speed will be greatest when the vertex is in its central position, that is, when the optical path to the film is shortest. Before it reaches this position and after it passes it the lateral speed is less. To obtain minimum deviation from exact compensation, therefore, the linear speed of the vertex should be such that not the maximum value of the lateral velocity but its average value is equal to one-half the speed of the film.

Throughout the specification and claims where the word "vertex" occurs what is meant is the optical or "virtual vertex" as distinguished from the physical vertex unless the contrary appears from the context.

If the two reflecting surfaces which compose the compensating element are two plane mirrors at right angles, their reflecting surfaces might not physically intersect, in which case the virtual vertex would be the intersection of extensions of said plane reflecting surfaces. When the two reflecting surfaces are formed by a right angle prism of glass the "virtual vertex" does not coincide with the physical vertex, due to refraction in the glass; but, is on a line through the vertex perpendicular to the face of the prism and at a distance below the surface of the glass, bearing the same ratio to the distance of the vertex from this surface as unity bears to the index of refraction of the glass.

From the foregoing it will be seen that an essential characteristic of the invention is that the compensating element, whether it be composed of two plane mirrors having their reflecting surfaces at right angles to each other, or of a totally reflecting right angle prism, must move in such manner that during its optically effective travel its virtual vertex shall move in an arcuate path at a constant fraction of the linear velocity of the film, said constant fraction being such that the average value of the linear velocity shall be one-half the linear velocity of the film. In the instance illustrated, the virtual vertices are generators of a true cylindrical surface having a radius relatively large as compared with the arc of optically effective travel. Said compensating elements are preferably totally reflecting prisms, and preferably a series of such prisms are carried on a rotary drum or carrier so that a pure motion of rotation is obtained. Said carrier is also preferably keyed to the same shaft which carries the rotary film-driving sprocket so that said sprocket and carrier will turn together as one part, thus preserving the relative speeds of the film and compensating elements. The ratio between the radius of the path of the virtual vertices of the compensating elements and the radius of the film driving sprocket is such as to secure the aforesaid calculated fractional relation of the velocity of the compensating elements to that of the film. The light beam is alternately projected by the helical mirrors having the angle of their surfaces progressively varying, whereby the beam is caused to follow successive film pictures and also the successive slower moving compensating elements. The virtual vertices of the prisms must be parallel with the axis of rotation of the carrier; they must be equally distant from the axis of rotation and equally distant apart one from another. To this end, the universal adjustment of the prisms individually is provided for as above described, and the prisms are each carried by a holder which removes all strain from the glass such as would tend to distort the surfaces and produce optical errors due to distortion of the glass.

I claim:

1. In a continuous motion cinematograph, a compensating element comprising two reflecting surfaces at right angles to each other, and means to move said compensating element at an angle to the vertex between said surfaces in such manner that during its optically effective travel every point of its virtual vertex moves in an arcuate path at the same constant fraction of the linear velocity of the film.

2. In a continuous motion cinematograph, a totally reflecting compensating right angle prism, and means to move said compensating prism about an axis parallel to its vertex, whereby during its optically effective travel its virtual vertex moves in an arcuate path at a constant fraction of the linear velocity of the film.

3. In a continuous motion cinematograph, a plurality of compensating elements, each comprising two reflecting surfaces at right angles to each other, and means to move said compensating elements about an axis parallel to their vertex, whereby during their optically effective travel their virtual vertices move in an arcuate path at a constant fraction of the linear velocity of the film.

4. In a continuous motion cinematograph, a plurality of compensating elements, each comprising two reflecting surfaces at right angles to each other, means to move said compensating elements in such manner that during their optically effective travel their virtual vertices move in a cylindrical path at a constant fraction of the linear velocity of the film, and means to project a beam of light through said film first to one and then to another of said compensating elements.

5. In a continuous motion cinematograph, a series of compensating elements each comprising two reflecting surfaces at right angles to each other, a rotary carrier on which said compensating elements are mounted so that their optical vertices define a cylindrical surface, means to rotate said carrier at such speed that the virtual vertices of the compensating elements move at a constant fraction of the linear velocity of the film, and means to project a beam of light through successive film pictures to the successive compensating elements.

6. In a continuous motion cinematograph, a series of compensating elements, a rotary carrier on which said compensating elements are mounted, said elements each comprising two reflecting surfaces at right angles to each other and to a plane of rotation of said carrier, a rotary film-driving element adapted to move the film continuously and rigidly connected to and turning as one part with said rotary carrier, the ratio between the radius of the path of the virtual vertices of the compensating elements and the radius of the rotary film-driving element being such that the said vertices move at a constant fraction of the linear velocity of the film, and means to project a beam of light through successive film pictures to the successive compensating elements.

7. In a continuous motion cinematograph, a series of compensating elements, a rotary carrier on which said compensating elements are mounted, said elements each comprising two reflecting surfaces at right angles to each other and to a plane of rotation of said carrier, means to rotate said carrier at such speed that the virtual vertices of the compensating elements move at a constant fraction of the linear velocity of the film, and means to cause a light beam to follow successive film pictures and also the successive slower moving compensating elements.

8. In a cinematograph, means for continuously moving the film, a series of compensating elements each comprising two reflecting surfaces at right angles to each other, a rotary carrier on which said compensating elements are mounted, means to rotate said carrier at such speed that the virtual vertices of the compensating elements move at a constant fraction of the linear velocity of the film, and helical mirror means adapted to cause a light beam to follow successive film pictures and also the successive slower moving compensating elements and means for rotating said helical mirror means.

9. In a motion cinematograph, means for continuously moving the film, a series of compensating elements each comprising two reflecting surfaces at right angles to each other, a rotary carrier on which said compensating elements are mounted, means to rotate said carrier at such speed that the virtual vertices of the compensating elements move at a constant fraction of the linear velocity of the film, and a plurality of identical helical mirrors, the angle made by an extension of a radial element of the reflecting surfaces of each helical mirror with its axis of rotation varying progressively along the length of the mirror, said mirrors being adapted to cause a light beam to follow successive film pictures and also the successive slower moving compensating elements and means for rotating said helical mirrors.

10. In a continuous motion cinematograph, a rotary carrier, a series of compensating elements, each comprising two reflecting surfaces at right angles to each other, mounted on said carrier, and means to adjust said compensating elements individually in respect to the relation of their virtual vertices to the direction of the axis of rotation of the carrier, the distance from said axis of rotation, and the distance of said vertices one from another.

11. In a continuous motion cinematograph, a rotary carrier, a series of totally reflecting compensating right angle prisms mounted on said carrier, and means to adjust said compensating prisms individually in respect to the relation of their virtual vertices to the direction of the axis of rotation of the carrier, the distance from said axis of rotation, and the distance of said vertices one from another.

12. In a continuous motion cinematograph, a rotary carrier, a series of totally reflecting compensating right angle prisms, a holder for each prism mounted on the carrier, and means to adjust said holders individually on the carrier in respect to the relation of the virtual vertices of the prisms to the axis of rotation of the carrier, the distance of said vertices from said axis of rotation, and the distance of said vertices one from another.

13. A continuous motion cinematograph having film driving means and a compensating element comprising relatively fixed reflecting surfaces in planes at an angle to each other, said planes having a vertex in a plane intersecting the line of motion of the film, and means for moving the vertex defined by said planes substantially in the direction of motion of the film at a fraction of the linear velocity of said film.

14. A continuous motion cinematograph having film driving means and an element for compensation by reflection for motion of the film comprising reflecting surfaces in planes intersecting each other in a plane substantially perpendicular to the line of motion of the film, and means for bodily moving said compensating element about an axis parallel to the planes of said surfaces.

15. A cinematograph having driving means for continuously moving the film and an element for compensation by reflection for motion of the film comprising reflecting surfaces in planes intersecting each other in a plane crosswise of the line of motion of the film and means for bodily moving said surfaces in fixed relation to each other substantially in the same direction as the film at a linear velocity less than that of said film.

16. A continuous motion cinematograph having film driving means and an element for compensation by reflection for motion of the film comprising reflecting surfaces in planes intersecting each other in a plane crosswise of the line of motion of the film and means for bodily moving said compensating element in an arcuate path having a radius greatly in excess of the length of the optically effective travel of said element, said path lying substantially in the same direction as the film.

17. A cinematograph having means for continuously driving a film, a compensating element comprising two reflecting surfaces relatively fixed in planes intersecting each other at a vertex in a plane crosswise of the plane of motion of the film, and means for moving said element in substantially the same direction as the film at a rate related to the motion of said film while maintaining a constant direction of said vertex, whereby to reflect light from a part of said film along a substantially constant line during a predetermined travel of said part.

Signed by me at Boston, Massachusetts, this seventh day of November, 1914.

WILLIAM BURTON WESCOTT.

Witnesses:
ROBERT CUSHMAN,
RICHARD W. HALL.